Patented Feb. 16, 1932

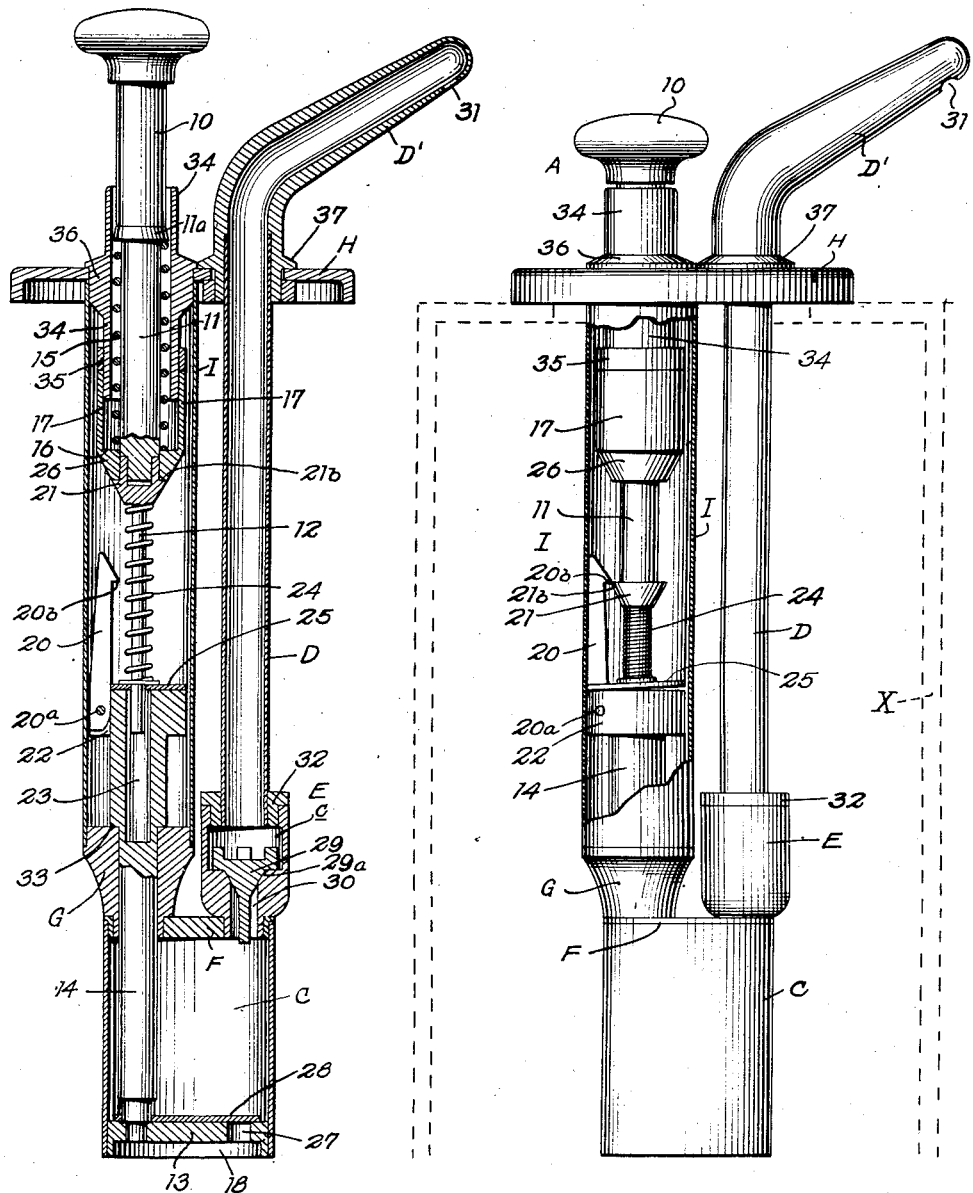

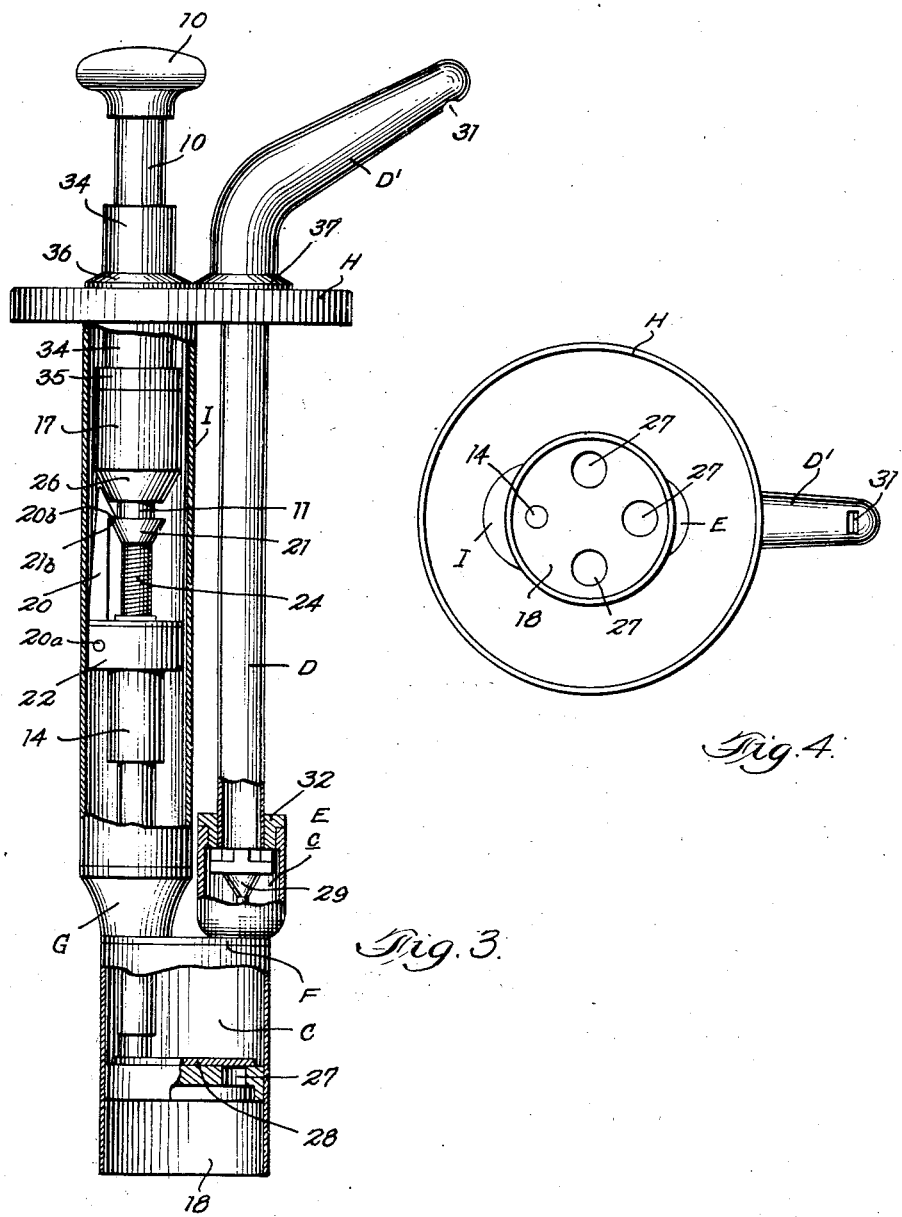

1,845,039

UNITED STATES PATENT OFFICE

BENJAMIN H. ALVEY, OF LOUISVILLE, KENTUCKY, ASSIGNOR TO ALVEY-FIHE COMPANY, INCORPORATED, OF LOUISVILLE, KENTUCKY, A CORPORATION OF KENTUCKY

DISPENSING PUMP

Application filed November 17, 1926. Serial No. 148,860.

The principal purpose of this invention is to provide a pump of simple, strong and easily operated construction for dispensing at each operation thereof a predetermined quantity of liquid—as a flavoring syrup, for example—and whose parts are so correlated that the amount of liquid predetermined by the proprietor to be dispensed at each operation of the pump may not be varied by manipulation by the operative of the operating handle. Pumps of this character may be very usefully employed in connection with soda fountains for dispensing flavoring syrups forming parts of beverages, for example, such as are commonly sold at such fountains.

Pumps of the type to which this invention relates are constructed to be mounted upon a container of the syrup to be dispensed, and each includes a piston chamber formed to contain a single charge of syrup received in said chamber from the container during one (the intake) stroke of the piston. Each also includes a discharge spout whose outlet is outside the container and whose inlet is so related to the chamber as to receive the charge of liquid from said chamber during the liquid discharging stroke of the piston. In short, and assuming that the chamber contains a charge of liquid and the spout also contains a charge of liquid, the pump at each subsequent operation thereof will, during the liquid-discharging stroke of the piston, force the syrup from the chamber into the spout and thereby force from the spout the charge stored therein during the previous liquid-discharging stroke of the piston, the former charge being thus replaced by the new charge and said new charge being dispensed at the next liquid-discharging stroke of the piston. Between these liquid-discharging strokes of the piston new charges of liquid are received in the chamber under control of the intake or non-liquid discharging strokes of the piston.

In the pump of the instant application, the piston-operating mechanism is normally in non-operative relation with the piston and will not become operative with relation to the piston until the operative has caused it to move throughout the entire distance of its travel which will result in the discharge, upon movement of the piston in liquid-discharging direction, of the full and exact charge of liquid predetermined to be dispensed at each operation of the pump. During movement of the operating mechanism toward the piston, a spring is placed under tension and at the end of said movement the piston operating mechanism and piston are releasably connected automatically with each other. Release of the pressure which forced the piston operating mechanism into its operative relationship with the piston and which caused said mechanism and piston to be connected together, will render the spring operative to cause the piston and its said operating mechanism to move unitarily in the liquid-discharging stroke of the piston. At the end of this stroke, the piston is automatically disconnected from its operating mechanism and returns to its former position in the chamber, a new charge of liquid being received within the piston chamber during the said return movement of the piston to replace that which was discharged from said chamber and stored in the spout during the discharging movement of said piston.

Particular purposes of the present invention are (1) to provide a piston operation mechanism of simple form; (2) to provide an improved correlation of parts for preventing drainage of the liquid back into the container from the piston chamber and back into the piston chamber from the spout, which drainage if not prevented would in itself result in varying the amount of liquid from that intended to be dispensed at each operation of the pump; and (3) to simplify the construction by which the supply of liquid from the container to the piston chamber is controlled in the non-discharging stroke of the piston.

In the accompanying drawings illustrating the preferred embodiment of the invention and in which like characters of reference denote corresponding parts in the corresponding views, Fig. 1 is a vertical section through a syrup-dispensing pump showing the operating member and the liquid-discharging member in the positions they normally occupy, respectively: that is, in the positions they occupy when the pump is not actually being used in the discharge of the syrup at which time the operating member and the liquid discharging member are disconnected from each other;

Fig. 2 is a view, in elevation, with a part of the casing broken away and shows the operating member in its extreme inner position ready to be engaged by a member which locks it with relation to the liquid discharging element, ready for the working movement of the latter;

Fig. 3 is a view partly in vertical section and partly in elevation showing the parts in their relative positions immediately before the conclusion of the working movement of the liquid-discharging element; and Fig. 4 is a bottom plan view.

The pump comprises a piston operating means which includes a handle member 10, an endwise movable stem 11, hereinafter called "piston operating member" and a member 12 which moves with the piston operating member 11. In the particular construction herein illustrated to exemplify what I now regard as being a suitable embodiment of the invention, the members 10 and 11 are connected at all times for unitary movement. The piston comprises a head 13 and a stem 14. The piston head 13 is mounted to reciprocate within a chamber C having an inlet opening 18 and an outlet port 19. This chamber C is designed to contain a charge of liquid supplied thereto from the container X in which the pump while in use is mounted. Normally, the piston occupies a position adjacent the liquid inlet end 18 of the chamber and in the herein exemplified form of the invention, the piston closes the inlet port 18 and its liquid discharging movement is longitudinally of the chamber and toward the outlet port 19 which is here shown as being at the upper end of the chamber. The piston also includes a latch 20 which is pivoted at 20ᵃ between ears 22 carried by the piston stem which forms one of two complementary elements by which the piston and the piston operating member are releasably connected for unitary movement. The piston operating member normally occupies a position which is retracted with relation to the piston and is held normally in said position by a spring 15 which encircles the piston operating member and has its opposite ends engaged with an abutment 11ᵃ on said member and a shoulder 16 at the lower end of a sleeve 17. This member 11 is provided with an element 21 which normally is spaced from the latch 20 and is carried into an interengaging relationship with a shoulder 20ᵇ formed near the upper end of the latch, the said interengaging relationship of the element 21 and the shoulder 20ᵇ being brought about by endwise movement of the piston operating member 11, imparted thereto by like movement given the handle 10 by the operative, the said movement of the piston operating member, of course, being relative to the piston whose head at this time is located in the liquid inlet end of the chamber C.

The space which separates the latch engaging element 21 and the portion of the latch which is to interengage with said element when they are in their referred to normal positions is substantially equal to the distance traversed by the piston in effecting a discharge of a regulated quantity of liquid, as previously herein suggested. Therefore, a relative movement of the operating member and liquid-discharging member throughout the distance referred to is necessary before they become operative, one with relation to the other, to effect the discharge of the liquid. The latch 20 and latch engaging element 21 exemplify a desirable means to automatically connect the piston or liquid discharging member and piston operating member with each other for unitary movement at the end of the relative movement referred to. The latch 20 has its end remote from its pivot beveled and formed with the shoulder 20ᵇ. The latch-engaging element has its side correspondingly beveled to engage the beveled portion of the latch and is formed with a shoulder 21ᵇ to be engaged by the shoulder 20ᵇ of the latch. A spring 24 which encircles the part 12 of the operating member and which abuts at one end against the inner surface of the latch-engaging member 21, has its other end abutting against a projection 25 which extends from the latch 20 and rests on the inner end of the piston stem 14. It will be noted, therefore, that this spring is placed under tension by inward movement of the operating member and also by a pivotal movement of the latch 20. Therefore, it is operative to hold the latch 20 with its head yieldably in the path traversed by the latch-engaging member 21, it being understood that the correlation of the head of the latch and said member 21 is such that during the later portion of the movement of the operating member in an endwise direction and inward toward the piston, the latch-engaging member will press upon the latch head until it has passed the same. During this relative movement of the latch 20 and latch-engaging member 21, the spring 24 will operate to hold the latch 20 against its said engaging member until the shoulder on said latch has passed the corresponding shoulder on the latch, whereupon the spring 24 will operate to move the latch into its locked position with respect to the latch engaging member and will hold it against accidental displacement from said position. When the operating member and the liquid-discharging member have been thus operatively connected, pressure upon the operating member A is released, whereupon the spring 15 becomes operative to raise the operating member and the liquid-discharging member as a unit, and this effects the discharge of the liquid within the spout D, as will hereinafter be more fully set forth. When the operating member and the liquid discharging member have been raised by the spring 15 to the position at which the discharge of the regulated quantity of liquid has been effected, the latch is automatically released from the latch-engaging member, thereby automatically releasing the liquid-discharging member which immediately returns to its lower position within the chamber C. This release, in the illustrated embodiment of the invention, is effected by a member 26 at the lower end of the sleeve 17, the member 26 being beveled and in the path of upward movement of the latch, as shown. The spring 24, in this embodiment of the invention, assists gravity in causing the piston to return to its lower position. During relative movements between the piston operating member and the piston, the rod 12 which in the illustrated embodiment is substantially a part of the piston operating member traverses the opening 23 in the piston stem 14 and acts as a guide for the piston operating member. It will be noted that the piston head is provided with one or more ports 27 (three such ports being shown in Fig. 4) through which the liquid which has been drawn from the container into the part of the chamber on one side of the piston in the discharging movement of the piston is caused upon reverse stroke of said piston to pass through the piston head and into the part of the chamber on the other side of the latter. These ports are closed by a suitable valve, as 28, which will yield to the pressure of the incoming liquid and will operate to prevent drainage of the chamber C through the ports 27.

During the upward travel of the piston head 13 the liquid in the spout D will be discharged. This discharge is due to the entrance of the liquid from the chamber C into the lower end of the spout, caused primarily by the raising of the piston head 13. Between the chamber C and the spout D there is, in the illustrated embodiment of the invention, a chamber c within which an automatically operated and suitably guided check valve 29 is arranged. This check valve controls a port 30 through which the chamber c has communication with the chamber C, and, as herein illustrated, is so constructed that in co-operation with its seat 29ᵃ and the port 30 it will unfailingly and absolutely close communication between the spout and the chamber C with no liability whatsoever of any leakage around the valve and through the seat and port, wholly by the weight, or pressure, of the liquid in the spout when relieved of the pressure of liquid in the chamber C—that is, during the downward (non-liquid discharging) stroke of the piston head and until the chamber C has received a fresh charge of syrup and the next discharging stroke of the piston is started. Thus, it will be noticed that the valve seat includes a beveled section and a plane or flat section formed by a shoulder which extends about the upper end of the beveled section, and that the valve is formed to provide a flange to engage said shoulder, a conical section which extends through and is seated upon the beveled section of the latter, with which it has a ground fit, and a guiding stem which projects into the port from the inner end of said conical section: so that, in effect, there are two valve seats, one formed by the plane or flat shoulder and the other by the beveled section, respectively engaged by the conical and plane sections of the valve. The chamber c has an open communication with the inlet end of the spout D. It will be apparent that the pressure of the liquid caused by the raising of the piston head 13 will raise the check valve 29 and permit the liquid to flow into the chamber c and thence into the spout D during the entire raising movement of the piston head. It will also be apparent that when this pressure has been removed the check valve will unfailingly return to its seat 29ᵃ and will absolutely prevent drainage back into the chamber C of any liquid in the spout D. The discharge of the liquid from the spout D is effected through the opening 31 at the upper end of said spout. The chamber c and the port 30 are formed in a cup E which is screwed or otherwise suitably attached to a cap F at the upper end of the piston chamber C. The cup is provided with a cap nut 32 into which the lower end of the spout D is screwed or otherwise mounted. This provides a strong, durable and inexpensive means of connecting the spout to the piston chamber, having provision for a check valve therein. Suitably secured to the cap F is a collar G through which the piston stem 14 extends. A shoulder 33 on the piston stem co-operates with the upper surface of the collar in limiting downward movement of the piston 13. The sleeve 17 which carries the latch releasing element 26 is threaded or otherwise suitably secured to an inner sleeve 34, the means for securing it to the inner sleeve being of such nature that it may be adjusted relatively to the latch to variably regulate the travel of the piston head 13 and hence variably regulate the quantity of liquid to be discharged at every operation of the piston. A lock ring, or other suitable means 35 is provided to hold the sleeve 17 against accidental movement on the sleeve 34. H designates the cover plate which, in this type of pumps, serves as the means by which the pump is attached to the liquid container, X, Fig. 2. The sleeve 34 extends through an opening in the cover plate H and the part 11 of the operating member extends through it. As herein shown, it has a thickened portion at 36 to adapt it for connection to the cover plate H and for connection to the upper end of a sleeve I whose lower end extends to the collar G to which it is suitably affixed. This sleeve I encases and thereby protects the latching means and the parts of the mechanism adjacent the latching means while giving a space for the pivotal movement of the latch. It also prevents tampering with the adjustable sleeve 17, the position of which, as already stated, determines the amount of liquid to be discharged at each operation. The collar G serves as a guide for the piston and stem and in co-operation with the sleeve I and inner sleeve 34 provides a means by which the operating member 11 and cover plate H and adjustable sleeve 17 are so connected that the pump will withstand indefinitely the rough usage met in constant service. The sleeve I also substantially contributes to the ease with which the sleeve 34 (which in addition to its other functions serves as a guide for the operating element A) and the collar G (which serves as a guide for the piston stem 14) may be so positioned with relation to each other that a perfect alinement of the operating element A and the piston stem will be secured readily.

The spout D also extends into an opening in the cover plate H. As here shown its discharge head D' is formed separate from its body and is suitably secured at its inner end to the upper end of said body and has a flange 37 to rest upon the cover plate.

It will be understood, that in the use of this pump for dispensing at each operation thereof, a predetermined quantity of a flavoring syrup or other liquid, the pump is inserted in the jar X, or other container of said liquid, with its cap engaged with and closing the mouth of the container. It will also be understood that the spout D and its head D' are supplied with a priming charge of liquid and that the piston chamber C is also supplied with a charge of liquid. In other words, the spout D and its head and also the piston chamber C, each, always contains a single charge of the liquid to be dispensed. These preliminary charges may be delivered to the spout and to the chamber C by operation of the pump as is apparent. The charge in the spout is retained therein by the check valve 29 and the charge in the chamber C is retained by the check valve 28. Assuming, therefore, that these charges have been supplied to the spout D and it is desired to dispense a charge, the operator presses the handle 10 to its inward limit of movement. This forces the latch engaging element 21 into contacting relation with the head 20ᵇ of the latch 20, which head is resiliently held in position for such engagement by the spring 24. When, in the inward movement of the handle 10, the shoulders of the latch 20 and latch engaging element have passed a position of alinement with each other, the spring 24 by its action upon the projection 25 from said latch causes the head of the latch to snap into an engaging relation with the shoulder of the element 21. During this movement, the position of the piston head 13 in the chamber C is not affected. The movement referred to accordingly was a preparatory movement during which there was no discharge of liquid. The operating member and the piston have, however, now been operatively connected with each other. The operative thereupon releases his pressure upon the handle 10. The spring 15 which was placed under tension by the inward movement of the handle 10 now becomes operative to raise said handle and piston operating member 12 and also the piston head 13 connected therewith. This is the discharging stroke of the piston. During this stroke, the charge of liquid in the chamber C is delivered to the spout D, forcing out of said spout the charge of liquid previously delivered to said spout and replacing the thus dispensed charge with the charge previously delivered to the chamber C. During this working stroke of the piston also the liquid is drawn from the container through the open end 18 of the piston chamber C into the portion of said chamber below the piston head. At this time the valve 28 is closed by the pressure of the liquid in the chamber C so that the liquid thus being drawn into the lower part of the chamber is prevented from reaching that part of the chamber on the other side of the piston head and thereby mixing with the charge of liquid which is being delivered to the spout D. When the charge previously in the spout D has been dispensed and said spout D has received another charge to be later dispensed, the piston will have reached that portion in its working stroke at which the head of the latch will be engaged with the latch releasing element 26. This element operates to disengage said head from the latch element 21 and thereby frees the piston from its connection with the operating member. The spring 24, which was placed under tension in the movement of the handle 10 relatively to the piston, now becomes operative to effect a positive return stroke of the piston 13. During this return stroke, the part of the chamber C between the piston head and the outlet from said chamber receives another charge of the liquid, through the ports 27, the valve 28 being opened automatically by the pressure of the incoming liquid thereagainst.

It will be noted that the quantity of liquid delivered at each operation of the pump is determined by the position with relation to the head of the latch of the element 26 on the sleeve 17 and that less than the full charge cannot be delivered at any one operation of the pump. In other words, short strokes will not deliver correspondingly short quantities. It will also be seen that the quantity of liquid delivered at each operation of the pump may be variably regulated by adjustment of the sleeve 17. Further, it will be noted that the quantity of liquid does not depend upon the level of the liquid in the container since there is no possibility of a drainage of the discharge spout back into the chamber C or into the container. Finally, it will be noted that all the working parts are encased and that the structure embodies casing means which makes it strong and durable.

The instant application is subsidiary in certain respects to claims included in Letters Patent of the United States issued August 6, 1929 and numbered 1,723,909, the said Letters Patent being based upon an application filed by me on March 19, 1928 and numbered serially 262,830 and the said claims having originated in the instant application, but were transferred to application No. 262,830, aforesaid.

Having thus described the invention and particularly set forth the preferred embodiment thereof what I believe to be new and desire to secure by Letters Patent and what I, therefore, claim as my invention, is :—

1. A liquid dispensing pump including a piston having a non-operating position and liquid - discharging and non - discharging movements from and to its said non-operating position; an operating handle provided with a piston-operating member which moves unitarily with the handle during both the discharging and non-discharging movements of the piston; releasably engageable elements respectively movable with the operating member and piston, said elements being spaced from each other a distance in accord with the quantity of liquid to be discharged at each operation of the pump and correlated to interengage and thereby connect the piston to the piston-operating member and handle automatically by movement of said handle and operating member through the space which separated said elements from each other; means to move the piston, operating member and handle unitarily when they are thus connected; and means to disengage said elements from each other at a predetermined place in their unitary movement to thereby permit the piston to return to its non-operating position.

2. A liquid-dispensing pump including a resiliently supported operating handle provided with a piston-operating member which moves unitarily with the handle at all times, a piston having a non-operating position in which it is disconnected from said piston-operating member and handle, fastening elements respectively movable with the piston and piston-operating member, said elements being correlated to connect said piston and operating member together for unitary movement by movement of the handle and piston-operating member relatively to the piston throughout a distance which corresponds to that movement of the piston requisite to discharge a full charge of liquid, means to disconnect said elements from each other at the end of said discharge movement of the piston to thereby permit the piston to return to its non-operating position, and a valve operative during the said return movement of the piston to open a passage through which a charge of liquid may be supplied to the pump to be discharged at a succeeding operation.

3. A liquid dispensing pump comprising a cover plate, a piston chamber spaced from the cover plate, a valve chamber secured to the wall of the piston chamber presented toward the cover plate, a discharge spout extending from the valve chamber and through the cover plate, a liquid-pressure operated valve in the valve chamber, a resiliently supported operating member having connection with the piston and casing means extending from the cover plate to the wall of the piston chamber presented to the cover plate and co-operating with said wall, piston chamber and cover plate to form a substantially tight and strong enclosure for the operating parts.

4. A liquid dispensing pump comprising a piston, a piston chamber to receive a charge of liquid to be dispensed, the chamber having an inlet to be closed by the piston and an outlet, a spout leading from the outlet and in which a charge of the liquid is stored, a check valve controlling communication between the spout and chamber, an operating means including a member having endwise movement toward the piston, co-operating elements respectively carried by said piston and member and operating to connect the piston and member for unitary movement at the end of the movement of the member toward the piston, means to impart said unitary movement and thereby cause the charge of liquid in the spout to be dispensed and the charge of liquid in the piston chamber to be transferred to the spout, and an element to disengage the said co-operating elements from each other and thereby disconnect the piston from the operating member when the charge of liquid in the spout has been dispensed and replaced by the charge in the piston chamber, the piston when thus disconnected being free to move away from said operating member and having a valved opening through which a new charge of liquid is supplied to the piston chamber by said movement of the piston relatively to the operating member.

5. In a liquid dispensing pump the combination of a piston chamber having a liquid inlet and a liquid outlet, a spout to contain a single charge of liquid, a check valve to control communication between the spout and chamber, a piston operative in said chamber, an endwise movable piston operating member, the piston and piston operating member each having movement relatively to the other and having complementary elements engageable with each other by endwise movement of the piston operating member toward the piston, for unitary movement of said piston and member, means to move the piston and operating member unitarily when said elements are engaged, and means operative with relation to said elements to free the piston from its said operating member for its return movement to its original position.

6. A syrup dispensing pump including a chamber, a piston having a port through which liquid enters the chamber under control of the piston, a valve operative with relation to the piston port to prevent drainage of liquid from the chamber, said piston operative to discharge liquid from the chamber, a discharge spout arranged to receive liquid so discharged from the chamber, a liquid-pressure-operated check valve to prevent drainage of liquid from the spout to the chamber, piston operating means and adjustable means operatively related to the piston operating means to predetermine the quantity of liquid to be discharged at each discharging operation of the piston.

7. A syrup dispensing pump including a chamber having an opening in one end for the inlet of liquid thereto and its opposite end provided with a closure formed with a discharge port, a piston having liquid discharging and non-discharging movements in said chamber and provided with a valved port through which liquid enters the chamber during the non-discharging movements of the piston, a member projecting from said closure and provided with a second chamber to have communication with the first mentioned chamber through said discharge port, and a spout extending from said second chamber; said member having a valve seat between the second chamber and the discharge port and provided with a valve having a flange to rest on said seat, said seat having a beveled section and said valve having a conical member which extends through the seat and engages the beveled section thereof, said valve being operative by the pressure of the liquid to permit flow of the liquid from the first mentioned chamber to the spout during the liquid discharging strokes of the piston and to prevent drainage of the liquid from the spout to said first mentioned chamber during non-discharging strokes of the piston.

8. A syrup dispensing pump including a chamber having an opening in its bottom for the inlet of liquid thereto and a closed top provided with a port for the discharge of liquid therefrom, a piston having upward liquid discharging and downward non-liquid discharging strokes in said chamber between said opening and port and normally positioned adjacent the inlet and of the chamber and closing said opening, adjustable means operatively related to the piston to predetermine the quantity of liquid to be discharged at each discharging operation of the piston, a discharge spout extending from said port and in which a charge of liquid to be dispensed is stored, a check valve operatively related to said port and spout and opened by the pressure of liquid during the upward stroke of the piston to thereby permit liquid in the portion of the chamber above the piston to replace that in the spout and closed during the downward stroke of the piston by the pressure of the liquid in the spout, to thereby prevent drainage of the liquid from the spout to the chamber, said piston having a port which is open during the downward stroke of the piston to admit liquid into the upper part of the chamber and a valve operatively related to the piston port to prevent drainage of the liquid from the portion of the chamber above the piston.

9. A liquid dispensing pump including a piston and a piston operating mechanism, the piston operating mechanism including a member movable relatively to the piston and said member and piston having unitary liquid discharging movement, the piston also having non-liquid discharging movement relatively to said member, elements releasably engageable with each other by movement of said member relatively to the piston to connect the member and piston to each other for their unitary movement, means to effect said unitary movement of the piston and member, means operative with relation to said elements to release the piston for its movement relative to said member at the end of the liquid discharging movement, a chamber in which the piston operates, said chamber having an opening for the inlet of liquid thereto and a port for the discharge of the liquid therefrom, a discharge spout extending from said port, a valve operatively related to said port and opened during the discharging movement of the piston to thereby permit liquid in the chamber to replace that in the spout and closed during the non-discharging movement of the piston to prevent drainage of the liquid from the spout back into the chamber, said piston having a port which is open during the non-discharging movement of the piston and a valve to close the piston port in the interim between the non-discharging and discharging movements of the piston and during said discharging movement.

10. A liquid dispensing pump including a chamber having an opening in its bottom for the inlet of liquid thereto and a closed top provided with a port for the discharge of liquid therefrom, a piston having upward liquid discharging and downward non-liquid discharging strokes in said chamber between said opening and port and normally positioned adjacent the inlet end of the chamber and closing said opening, a discharge spout extending from said port and in which a charge of liquid to be dispensed is stored, a check valve operatively related to said port and opened by the pressure of liquid during the upward stroke of the piston to thereby permit liquid in the portion of the chamber above the piston to replace that in the spout and closed during the downward stroke of the piston by the pressure of the liquid in the spout, to thereby prevent drainage of the liquid from the spout to the chamber, said piston having a port which is open during the downward stroke of the piston to admit liquid into the upper part of the chamber and a valve operatively related to the piston port to prevent drainage of the liquid from the portion of the chamber above the piston, and a piston operating mechanism which includes a member movable relatively to the piston, elements releasably engageable with each other by movement of said member toward the piston to connect the member and piston to each other for unitary movement, means to raise said piston and member when thus connected with each other, and means operative with relation to said elements to release the piston from said member at the end of the upward movement of the piston, said piston when thus released returning to its downward position in the piston chamber and in its said movement forcing a fresh charge of liquid into the portion of the chamber above the piston.

11. In a liquid dispensing pump the combination of a piston chamber having a liquid inlet and a liquid outlet, a spout, the chamber and spout each formed to contain a single charge of liquid, a check valve to control communication between the spout and chamber, a piston operative in said chamber and normally closing the liquid inlet, a piston operating member having movement relatively to the piston and said piston and operating member having elements engageable with each other by movement of the piston operating member toward the piston, for unitary movement of said piston and member, means to move the piston and operating member unitarily when said elements are engaged with each other to thereby effect the discharge of the charge of liquid in the spout and replace said charge with that in the chamber, means to release said elements from each other at the end of the discharging movement of the piston, said piston being movable to its former position when thus released and having a port for the ingress of liquid from the chamber inlet to the portion of the chamber on the side of the piston opposite said inlet, and a valve which closes the port automatically at the end of the return movement of the piston and until the beginning of the next return movement of the piston.

12. A pump for dispensing at each operation thereof a predetermined amount of a flavoring syrup: including a chamber and a discharge spout in each of which a single charge of the syrup is stored; a reciprocatory piston mounted within said chamber, and having a port through which the syrup enters the chamber on the down stroke of the piston: means to force the piston upwardly within said chamber to thereby expel the charge previously stored in the spout and replace said charge with the charge previously stored in the chamber, said pump having a port, through which the chamber has communication with the inlet end of the spout, formed to provide a valve seat having a beveled wall and a shoulder extending about the mouth of the beveled seat; a liquid-pressure operated check valve having a flanged upper end to rest upon said shoulder, a conical projection operatively related to said beveled seat and a stem projecting into said port from said conical projection; and a valve operatively related to the piston port and which opens automatically in the down stroke of the piston and thereby permits a fresh charge of syrup to enter the chamber through said port and is closed automatically at the end of said down stroke to thereby prevent drainage of the syrup from said chamber.

In testimony whereof I affix my signature.

BENJAMIN H. ALVEY.